US012654360B2

(12) United States Patent
Tanaka et al.

(10) Patent No.: US 12,654,360 B2
(45) Date of Patent: Jun. 16, 2026

(54) METHOD FOR REGENERATING USED RESIN

(71) Applicant: TOYODA GOSEI CO., LTD., Kiyosu (JP)

(72) Inventors: Yasuaki Tanaka, Kiyosu (JP); Kinji Furukawa, Kiyosu (JP); Hitoshi Uchida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 288 days.

(21) Appl. No.: 18/414,855

(22) Filed: Jan. 17, 2024

(65) Prior Publication Data

US 2024/0300145 A1 Sep. 12, 2024

(30) Foreign Application Priority Data

Mar. 9, 2023 (JP) ................................ 2023-036647

(51) Int. Cl.
*B29B 7/84* (2006.01)
*B29B 7/42* (2006.01)
*B29B 7/88* (2006.01)

(52) U.S. Cl.
CPC ............. *B29B 7/847* (2013.01); *B29B 7/426* (2013.01); *B29B 7/885* (2013.01)

(58) Field of Classification Search
None
See application file for complete search history.

(56) References Cited

U.S. PATENT DOCUMENTS

| | | | | |
|---|---|---|---|---|
| 5,350,788 | A | 9/1994 | Visioli et al. | |
| 5,804,111 | A * | 9/1998 | Kobayashi | B29C 48/57 425/149 |
| 2017/0001344 | A1* | 1/2017 | Baltazar-y-Jimenez | B29C 45/18 |
| 2022/0145050 | A1* | 5/2022 | McAlpin | C08J 11/04 |

FOREIGN PATENT DOCUMENTS

| | | | |
|---|---|---|---|
| DE | 102019114733 | A1 | 6/2020 |
| JP | 2005-194299 | A | 7/2005 |
| JP | 2022-521976 | A | 4/2022 |
| WO | WO-2012/115309 | A1 * | 8/2012 |
| WO | WO-2019/097407 | A1 * | 5/2019 |
| WO | 2020/176287 | A1 | 9/2020 |
| WO | 2021263125 | A1 | 12/2021 |

OTHER PUBLICATIONS

Office Action dated Mar. 17, 2026 issued in corresponding Japanese patent application No. 2023-036647 (and English machine translation).

* cited by examiner

*Primary Examiner* — Mohammad M Ameen
(74) *Attorney, Agent, or Firm* — Posz Law Group, PLC

(57) ABSTRACT

A method for regenerating a used resin includes adding 0.03 wt % to 0.3 wt % of an amine compound-based VOC capturing agent to the used resin, performing melt-mixing, capturing at least formaldehyde and acetaldehyde among VOCs contained in the used resin by the VOC capturing agent, and vaporizing and removing volatile odor substances contained in the used resin by decompression.

11 Claims, 2 Drawing Sheets

METHOD FOR REGENERATING USED RESIN

TECHNICAL FIELD

The present invention relates to a method for regenerating a used resin into a regenerated resin that is recyclable.

BACKGROUND ART

Used resins often emit odors due to volatile organic compounds (VOCs) contained therein and the like, and have a limited range of recycling applications when they are directly used. Therefore, attempts have been made to produce regenerated resins with inhibited odors by adding an odor inhibiting agent to used resins.

Patent Literature 1 describes addition of a combination of a metal oxide such as Cao as an odor inhibiting agent and an acidic copolymer to a post-consumer resin (used resin). Metal oxides are specified as those having a band gap exceeding 5.0 eV, and in addition to Cao, MgO, Sro, $Al_2O_3$ and the like may be exemplified. The acidic copolymer is a copolymer containing an ethylene monomer and a carboxylic acid comonomer.

However, the regeneration method in Patent Literature 1 has the following problems. When metal oxides such as Cao are added to used resins, the tensile elongation and impact strength, especially related to toughness of the regenerated resins, decrease, which results in increased use of down-cycles, and makes it difficult to recycle them into original parts.

Volatile hetero-carbonyl species (volatile C1 to C16 aldehydes, ketones, carboxylic acids, esters, alcohols, and ethers) are exemplified as odor components, but there is no description of removal of hydrocarbon compounds (they are considered irremovable).

Used resins are mainly derived from packaging containers (bottles, packages, and films), and there is no description that they are derived from scrapped automobiles. Here, even with the related art other than Patent Literature 1, there are few cases in which used resins derived from scrapped automobiles are regenerated and recycled into automobile interior parts.

CITATION LIST

Patent Literature

[Patent Literature 1] Japanese Unexamined Patent Application Publication (Translation of PCT Application) No. 2022-521976 (JP 2022-521976 A)

SUMMARY OF THE INVENTION

Technical Problem

Therefore, an object of the present invention is to regenerate a used resin into a regenerated resin in which an odor is inhibited and a decrease in the tensile elongation and impact strength related to toughness is also minimized, and which has a wide range of recycling applications.

Solution to Problem

[1] A method for regenerating a used resin, including adding 0.03 wt % to 0.3 wt % of an amine compound-based VOC capturing agent to the used resin, performing melt-mixing, capturing at least formaldehyde and acetaldehyde among VOCs contained in the used resin by the VOC capturing agent, and vaporizing and removing volatile odor substances contained in the used resin by decompression.

[Effects]

When 0.03 wt % to 0.3 wt % of the amine compound-based VOC capturing agent is added to the used resin and the mixture is melt-mixed, as shown in the following chemical reaction formula, at least formaldehyde and acetaldehyde among VOCs contained in the used resin are captured by the VOC capturing agent, and an odor of the regenerated resin is reduced. In addition, volatile odor substances contained in the used resin are vaporized and removed by decompression, C11 to C18 low-molecular-weight hydrocarbons that are considered irremovable with Cao and the like are removed, and an odor of the regenerated resin is further reduced.

[Chem. 1]

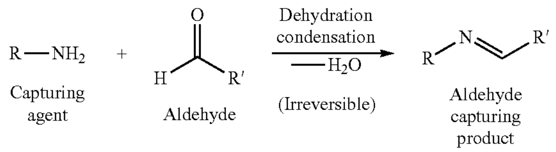

Capturing agent   Aldehyde   Aldehyde capturing product

When the amount of the VOC capturing agent added is less than 0.03 wt %, the capturing is insufficient, and when the amount exceeds 0.3 wt %, the tensile elongation and impact strength of the regenerated resin decrease. The amount of the VOC capturing agent added is more preferably 0.04 wt % to 0.2 wt %.

[2] The method for regenerating a used resin according to [1], wherein the used resin is derived from a scrapped automobile.

When the used resin is derived from scrapped automobiles, the odor of the used resin derived from the scrapped automobile, which could not meet odor standards in the related art, can be sufficiently reduced, and the regenerated resin that satisfies odor standards can be obtained. The regenerated resin can be recycled into automobile interior parts. In this manner, recycling of the used resin derived from the scrapped automobile which is generated in a large amount can contribute to reducing the amount of $CO_2$ emitted and creating a circular economy.

[3] The method for regenerating a used resin according to [1] or [2], wherein a virgin resin is mixed into the used resin.

When the virgin resin is mixed into the used resin, the properties of the regenerated resin become closer to those of the virgin resin, and the tensile elongation and the impact strength are improved.

[4] The method for regenerating a used resin according to any one of [1] to [3], wherein a phosphite-based antioxidant is added to the used resin before the melt-mixing.

When the phosphite-based antioxidant is added to the used resin before melt-mixing, as will be described below, the odor evaluation is improved. The phosphite-based antioxidant directly reacts with peroxides and radicals, which deteriorated resin products contained in the used resin, and stabilizes them, inhibiting production of low-molecular-weight components.

[5] The method for regenerating a used resin according to any one of [1] to [4], wherein the melt-mixing is performed using a kneading extruder.

When the melt-mixing is performed using a kneading extruder, the regeneration efficiency becomes higher than when it is performed using an independent kneading machine.

[6] The method for regenerating a used resin according to [5], wherein the decompression is performed in a vacuum vent of the kneading extruder.

When the decompression is performed in a vacuum vent of the kneading extruder, the regeneration efficiency is higher than when it is performed using an independent decompression machine.

The kneading extruder may be a single-screw kneading extruder or a twin-screw kneading extruder.

[7] The method for regenerating a used resin according to [5], wherein two of front and rear kneading extruders in series are used.

When the melt-mixing is performed using the two of front and rear kneading extruders in series, the VOCs can be sufficiently captured by the VOC capturing agent.

The VOC capturing agent can be added by either or both of the front and rear kneading extruders, but it is preferable to add the VOC capturing agent during first kneading in which the used resin recovered from the scrapped automobile melts and is re-pelletized because the capture effect is strong.

The decompression can be performed by decompression-degassing in either or both of the front and rear kneading extruders, but it is preferably performed in at least the rear kneading extruder. This is because low-molecular-weight components and the like can be removed with less waste by performing decompression-degassing in the final stage of obtaining the regenerated resin.

The virgin resin can be mixed in in either or both of the front and rear kneading extruders, but it is preferably performed in the rear kneading extruder in order to suppress the concentration of the VOC capturing agent in the used resin from becoming low in the front kneading extruder. In addition, it is more effective to first melt and re-pelletize the recovered used resin in order to uniformize the various mixed in used resins.

The phosphite-based antioxidant can be added in either or both of the front and rear kneading extruders, but it is preferable to add the phosphite-based antioxidant during first kneading in which the used resin recovered from the scrapped automobile melts and is re-pelletized because it has a strong deterioration inhibition effect.

Advantageous Effects of Invention

According to the present invention, used resins can be regenerated into regenerated resins in which an odor is inhibited and a decrease in the tensile elongation and impact strength related to toughness is small, and which have a wide range of recycling applications.

DESCRIPTION OF EMBODIMENTS

<1>Used Resin

Figure 1:
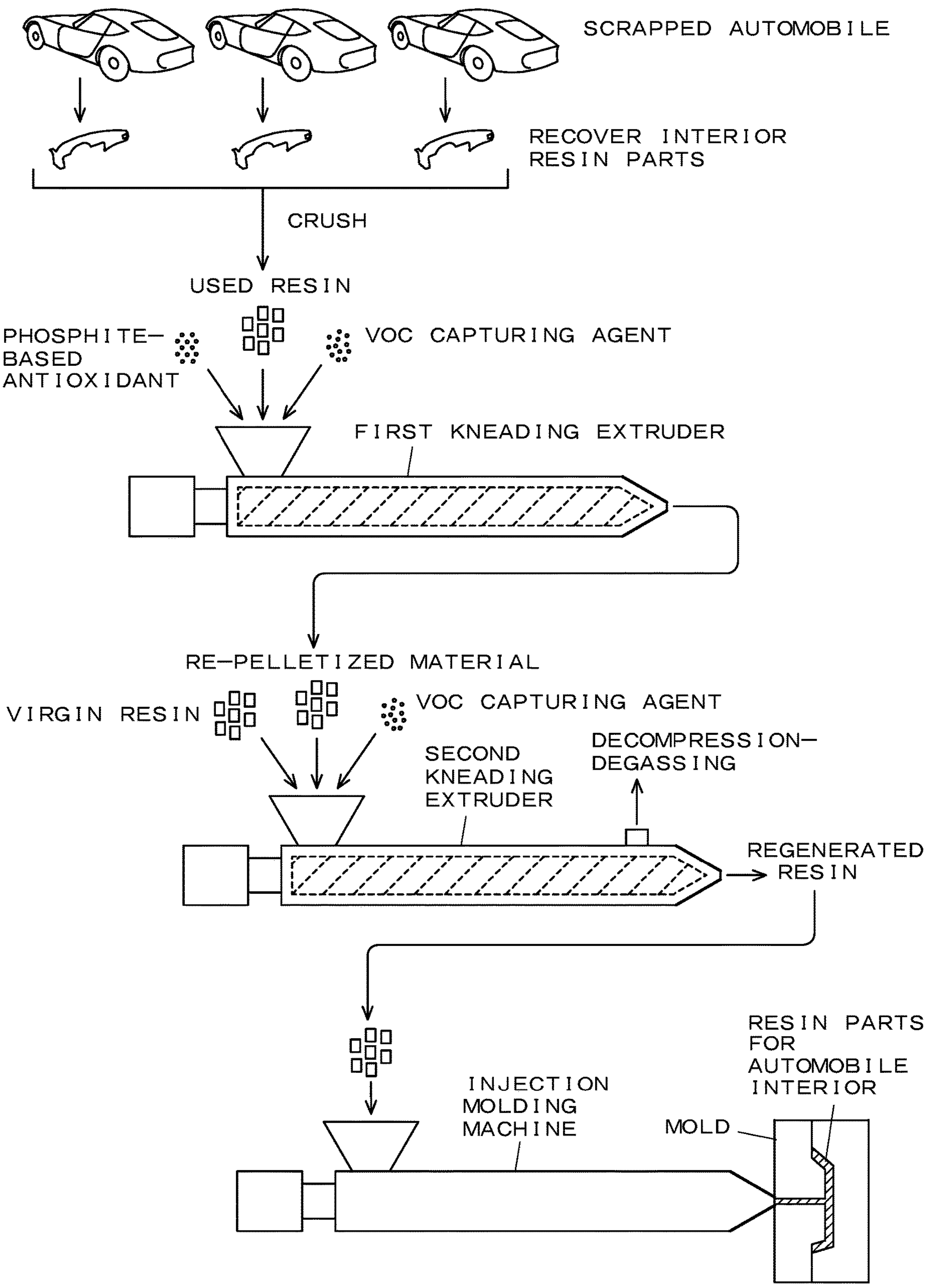
FIG. 1 is a diagram illustrating a method for regenerating a used resin of an example.

The resin type of the used resin is not particularly limited.

The used resin is preferably a crushed product such as crushed flakes and granules.

The usage time, usage conditions and the like of the used resin are not particularly limited.

The origin (usage application) of the used resin is not particularly limited, and those derived from scrapped automobiles can be suitably used, and particularly, resin parts for the interior of scrapped automobiles can be suitably used.

<2>VOC

Examples of VOCs contained in the used resin include formaldehyde, acetaldehyde, toluene, xylene, ethylbenzene, styrene, and methyl ethyl ketone. In the present invention, at least formaldehyde and acetaldehyde among VOCs are captured and reduced by an amine compound-based capturing agent.

<3>Amine Compound-Based VOC Capturing Agent

The amine compound-based VOC capturing agent is not particularly limited, and examples thereof include aliphatic amines (methylamine, ethylamine, diphenylamine, ethylenediamine, hexamethylenediamine, spermidine, spermine, etc.), diethylamine, hydroxylamine, hydrazine, hydrazide compounds (adipic acid dihydrazide, etc.), etheramine, amino acids, amino acid-modified silica gel, aromatic amines (aniline, toluidine, tyramine, histamine, tryptamine, phenethylamine, etc.), and heterocyclic amines (piperidine, piperazine, pyrrole, imidazole, etc.).

<4>Volatile Odor Substances

Examples of volatile odor substances contained in used resins include the following substances.

Odor substances that are C11 to C18 low-molecular-weight hydrocarbons: $C_{10}H_{18}$ (cis-p-menth-8-ene, decahydronaphthalene, etc.), $C_{11}H_{20}$ (2-methyldecahydronaphthalene, etc.), $C_{11}H_{24}$, $C_{12}H_{26}$, $C_{15}H_{32}$, $C_{18}H_{38}$, and the like may be exemplified.

Odor substances that are polar substances: compounds containing S/N and the like, ketones, carboxylic acids, esters, ethers and the like, and it is thought that these substances are attached to and mixed into the resin due to long-term use. Specific examples thereof include butyl acrylate, 2-pentylthiophene, 2-hexylfuran, N compounds having a methyl group ($C_{10}H_{19}N$), cyclohexyl isothiocyanate ($C_7H_{11}NS$), and compounds having a propylene oxide framework.

<5>Phosphite-Based Antioxidant

The phosphite-based antioxidant is not particularly limited, and examples thereof include tris (2,4-di-tert.-butylphenyl) phosphite, 3,9-bis (octadecyloxy)-2,4,8,10-tetraoxa-3,9-diphosphaspiro [5.5] undecane, 3,9-bis (2,6-di-tert-butyl-4-methylphenoxy)-2,4,8,10-tetraoxa-3,9-diphosphaspiro [5.5] undecane, 2,2'-methylenebis (4,6-di-tert-butylphenyl) 2-ethylhexylphosphite, tris (nonylphenyl) phosphite, tetra-C12-15-alkyl (propane-2,2-diylbis (4,1-phenylene)) bis (phosphite), 2-ethylhexyldiphenylphosphite, isodecyl diphenyl phosphite, triisodecyl phosphite, triphenyl phosphite, tris (1, 1,1,3,3,3-hexafluoro-2-propyl) phosphite, and trihexylphosphite.

EXAMPLES

Next, examples of the present invention will be described. Here, materials, conditions, structures, shapes and sizes of examples are only examples, and can be appropriately changed without departing from the spirit and scope of the invention.

As shown in FIG. 1, resin regeneration of Examples 1 to 6 was performed in which a used resin made from a crushed material for resin parts of the interior of scrapped automobiles was melt-kneaded using two of front and rear kneading extruders in series: a first kneading extruder and a second kneading extruder, an amine compound-based VOC capturing agent was added in either kneading extruder at that time, and thus at least formaldehyde and acetaldehyde among VOCs contained in the used resin were captured by the VOC capturing agent, and volatile odor substances contained in the used resin were vaporized and removed by decompression-degassing in a vacuum vent of the second kneading extruder. In addition, for comparison, Comparative Examples 1 to 4 were also performed.

As shown in Table 1 below, Examples 1, 3, and 4 were performed by putting a used resin (also a phosphite-based antioxidant in Example 4) into the first kneading extruder, and putting a re-pelletized material extruded from the first kneading extruder, a virgin resin, and a VOC capturing agent 1 or a VOC capturing agent 2 into the second kneading extruder.

Examples 2, 5, and 6 were performed by putting a used resin and the VOC capturing agent 1 into the first kneading extruder and putting a re-pelletized material extruded from the first kneading extruder (also a virgin resin in Examples 2 and 5) into the second kneading extruder.

Comparative Examples 1 and 2 were performed by putting a used resin into the first kneading extruder and putting a re-pelletized material extruded from the first kneading extruder and a virgin resin into the second kneading extruder. However, in Comparative Example 1, decompression-degassing was not performed in the second kneading extruder.

Comparative Examples 3 and 4 were performed by putting a used resin into the first kneading extruder and putting a re-pelletized material extruded from the first kneading extruder, a virgin resin, and the VOC capturing agent 1 into the second kneading extruder. However, the amount of the VOC capturing agent 1 added was different from that of the examples.

TABLE 1

| | | Comparative Example | | | |
|---|---|---|---|---|---|
| | | 1 | 2 | 3 | 4 |
| Resin formulation | Used resin | 60 | 60 | 60 | 60 |
| | Virgin resin | 40 | 40 | 40 | 40 |
| VOC capturing agent | VOC capturing agent 1 First kneading extruder | — | — | 0.01% | 0.4% |
| | VOC capturing agent 1 Second kneading extruder | — | — | — | — |
| | VOC capturing agent 2 Second kneading extruder | — | — | — | — |
| Antioxidant | Phosphite-based antioxidant | — | — | — | — |
| Removal by vaporization of odor substances (decompression-degassing) | | — | ○ | ○ | ○ |
| VOC measurement (μg/sample) | Formaldehyde | 0.35 | 0.35 | 0.21 | 0.02 |
| | Acetaldehyde | 0.7 | 0.67 | 0.59 | 0.04 |
| | Toluene | 0.14 | 0.12 | 0.14 | 0.11 |
| | Xylene | 1.18 | 1.5 | 1.76 | 0.05 |
| | Ethylbenzene | 0.48 | 0.56 | 0.5 | 0.03 |
| | Styrene | 0.53 | 0.42 | 0.15 | 0.01 |
| Odor evaluation | Odor intensity | 2.5 | 2.3 | 2.6 | 1.2 |
| | Pleasantness/Unpleasantness level | −1.4 | −1.4 | −1.5 | −0.8 |
| Mechanical property | Tensile strength (MPa) | 21.9 | 22.5 | 23.6 | 22.7 |
| | Tensile elongation (%) | 35 | 26 | 36 | 22 |
| | Tensile modulus of elasticity (MPa) | 1700 | 1670 | 1740 | 1350 |
| | Charpy impact value ($kJ/m^2$) | 16.4 | 14.3 | 18.5 | 6.7 |

| | | Example | | | |
|---|---|---|---|---|---|
| | | 1 | 2 | 3 | 4 |
| Resin formulation | Used resin | 60 | 60 | 60 | 60 |
| | Virgin resin | 40 | 40 | 40 | 40 |
| VOC capturing agent | VOC capturing agent 1 First kneading extruder | — | 0.05% | — | — |
| | VOC capturing agent 1 Second kneading extruder | 0.05% | — | — | 0.05% |
| | VOC capturing agent 2 Second kneading extruder | — | — | 0.05% | — |
| Antioxidant | Phosphite-based antioxidant | — | — | — | 0.05% |
| Removal by vaporization of odor substances (decompression-degassing) | | ○ | ○ | ○ | ○ |
| VOC measurement (μg/sample) | Formaldehyde | 0.11 | 0.18 | 0.19 | 0.14 |
| | Acetaldehyde | 0.02 | 0.03 | 0.1 | 0.05 |
| | Toluene | 0.1 | 0.1 | 0.12 | 0.05 |
| | Xylene | 0.05 | 0.05 | 0.05 | 0.1 |
| | Ethylbenzene | 0.04 | 0.04 | 0.04 | 0.06 |
| | Styrene | 0.02 | 0.03 | 0.02 | 0.1 |
| Odor evaluation | Odor intensity | 1.6 | 1.4 | 1.5 | 1.4 |
| | Pleasantness/Unpleasantness level | −1.1 | −0.8 | −1 | −0.7 |
| Mechanical property | Tensile strength (MPa) | 21.4 | 22.2 | 22.8 | 21.4 |
| | Tensile elongation (%) | 30 | 37 | 34 | 33 |
| | Tensile modulus of elasticity (MPa) | 1720 | 1650 | 1770 | 1660 |
| | Charpy impact value ($kJ/m^2$) | 16.8 | 17.7 | 17.4 | 17.2 |

TABLE 1-continued

| | | Example | | Virgin |
|---|---|---|---|---|
| | | 5 | 6 | resin |
| Resin formulation | Used resin | 80 | 100 | — |
| | Virgin resin | 20 | — | 100 |
| VOC capturing agent | VOC capturing agent 1 First kneading extruder | 0.05% | 0.05% | — |
| | VOC capturing agent 1 Second kneading extruder | — | — | — |
| | VOC capturing agent 2 Second kneading extruder | — | — | — |
| Antioxidant | Phosphite-based antioxidant | — | — | — |
| Removal by vaporization of odor substances (decompression-degassing) | | ○ | ○ | — |
| VOC measurement (μg/sample) | Formaldehyde | 0.13 | 0.11 | 0.04 |
| | Acetaldehyde | 0.11 | 0.02 | 0.05 |
| | Toluene | 0.06 | 0.1 | 0.13 |
| | Xylene | 0.22 | 0.05 | 0.08 |
| | Ethylbenzene | 0.1 | 0.04 | 0.05 |
| | Styrene | 0.08 | 0.02 | 0.01 |
| Odor evaluation | Odor intensity | 1.6 | 1.9 | 1.6 |
| | Pleasantness/Unpleasantness level | −0.9 | −1.3 | 0.4 |
| Mechanical property | Tensile strength (MPa) | 20.9 | 21.7 | 22 |
| | Tensile elongation (%) | 28 | 28 | 40 |
| | Tensile modulus of elasticity (MPa) | 1480 | 1430 | 2050 |
| | Charpy impact value ($kJ/m^2$) | 13.6 | 12.5 | 30.2 |

Here, details of materials used are as follows.

Crushed material of resin parts recovered from scrapped automobiles: polypropylene resin Virgin resin: talc-reinforced polypropylene resin (for automobile interior parts)

The numerical values in the table are parts by mass (a total of 100 parts by mass of a resin).

VOC capturing agent 1: amino acid-modified silica gel (product name "Emidelete AC-103" commercially available from Tosoh Corporation)

VOC capturing agent 2: amine-supported aluminum hydroxide (product name "Kesmon NS-750" commercially available from Toagosei Co., Ltd.)

Phosphite-based antioxidant: tris (2,4-di-tert.-butylphenyl) phosphite (product name "Irgafos 168" commercially available from BASF Japan Ltd.)

The blending numerical values in the table are mass % with respect to a total of 100 parts by mass of the resin.

The regenerated resins of Examples 1 to 6 and Comparative Examples 1 to 4 extruded from the second kneading extruder, and the virgin resin were subjected to the following measurement tests.

[1] VOC Measurement

The regenerated resin and the virgin resin were used as samples of 80 $cm^2$ (a thickness of 2.5 mm) and according to Automotive Standards Organization JASO M902 "Methods of measuring diffused VOCs of automobile parts" sampling bag method, the VOCs were measured as follows.

(1) The inside of a sampling bag with a capacity of 10 L was purged with nitrogen gas, and heated and washed. The heating and washing temperature was 80° C., and purging was continuously performed for 8 hr.

(2) The sample was put into the sampling bag, and the bag was filled with 5 L of nitrogen gas and sealed.

(3) After sealing, the sample was put into a thermostatic chamber, and heated at 65° C. for 2 hr.

(4) After heating, the sample gas in the sampling bag was collected in a collection tube filled with a capturing agent (Tenax-TA commercially available from GL Sciences Inc.) and a DNPH cartridge (cartridge containing 2,4-dinitrophenylhydrazine).

(5) Tenax-TA was set in a gas chromatograph/mass spectrometer, and the VOCs were measured. The DNPH cartridge was set in a high performance liquid chromatography, and the VOCs were measured.

Table 1 shows the measurement results of the VOCs (formaldehyde, acetaldehyde, toluene, xylene, ethylbenzene, and styrene).

[2] Odor Test

The regenerated resin and the virgin resin were used as samples of 30×30 mm (a thickness of 2.5 mm), and the odor test was performed as follows.

(1) One end of a PET sample bag with a capacity of 5 L was cut and the sample was put thereinto.

(2) The cut edge was heated and pressed with a heat sealer.

(3) 4 L of nitrogen gas was filled in.

(4) The sample was heated in a thermostatic chamber at 80° C. for 1 hr. After heating, the sample was removed from the thermostatic chamber and cooled to room temperature.

(5) Five panelists smelled the odor. They maintained a distance of 3 cm to 4 cm between the sleeve and the nose, lightly pressed the bag with their hands and smelled the odor that came out. The panelists evaluated the odor intensity (0.0: no odor to strong 4.0: odor) and the very unpleasant to pleasantness/unpleasantness level (−3.0: 3.0: very pleasant) in 0.5 increments. In the evaluation, isovaleric acid was used as a reference odor, the odor intensity of isovaleric acid was 3.0, and the pleasantness/unpleasantness level was −2.0.

(6) The average values of the odor intensities and the pleasantness/unpleasantness levels of five panelists were used as the odor test results of the samples.

Table 1 shows the test results of the odor intensity and the pleasantness/unpleasantness level.

[3] Mechanical Properties

Tensile test: according to ISO 527-1, a tensile test was performed using the regenerated resin and the virgin resin as ISO No. 1 dumbbell test pieces at room temperature and at a test speed of 50 mm/min, and the tensile strength and the tensile elongation were measured. Similarly, the tensile modulus of elasticity was measured at a test speed of 1 mm/min. C harpy impact test: according to ISO 179, a Charpy impact test was performed using the regenerated resin and the virgin resin as 80×10×4 mmt notched test pieces at room temperature using a hammer 2J, and the Charpy impact value was measured.

Table 1 shows these measurement results.

In Comparative Example 1 in which no VOC capturing agent was added and decompression was not performed, there were formaldehyde of 0.35, acetaldehyde of 0.7, an odor intensity of 2.5, and a pleasantness/unpleasantness level of −1.4. In addition, in terms of mechanical properties, the tensile elongation was 35%, and the Charpy impact value was 16.4 $KJ/m^2$. When examined in comparison with Comparative Example 1, In Comparative Example 2 in which no VOC capturing agent was added and decompression was performed, the amounts of formaldehyde and acetaldehyde were slightly decreased, but there was a tendency for improvement in the odor intensity and the pleasantness/unpleasantness level.

In Comparative Example 3 in which 0.01% of the VOC capturing agent was added and decompression was performed, a decrease in the amount of formaldehyde and acetaldehyde was still small, and there was no improvement in the odor intensity or the pleasantness/unpleasantness level.

In Comparative Example 4 in which 0.4% of the VOC capturing agent was added and decompression was performed, the amounts of formaldehyde and acetaldehyde were greatly reduced, and the odor intensity and the pleasantness/unpleasantness level were greatly improved, but mechanical properties related to toughness were significantly reduced such as a tensile elongation of 22% and a Charpy impact value of 6.7 $KJ/m^2$.

On the other hand, in Examples 1 to 6 in which 0.05% of the VOC capturing agent was added and decompression was performed, the amount of formaldehyde was clearly reduced to 0.19 or less, the amount of acetaldehyde was clearly reduced to 0.11 or less, the odor intensity was clearly improved to 1.6 or less, and the pleasantness/unpleasantness level was clearly improved to −1.3 or more. In addition, in terms of mechanical properties related to toughness, a decrease was minimized such as the tensile elongation of 28% to 37%, and the Charpy impact value of 12.5 $KJ/m^2$ to 17.7 $KJ/m^2$.

In addition, comparing Examples 1 and 4, there was no clear difference in VOC measurements, but odor evaluation was improved when the phosphite-based antioxidant was added.

Comparing Examples 2, 5, and 6, there was no clear difference in VOC measurements, but odor evaluation was improved when the amount of the virgin resin blended in was larger.

Comparing Examples 1 and 3, even when a different amine compound was used as the VOC capturing agent, almost the same results were obtained in the VOC measurement and odor evaluation.

As described above, the regenerated resins of Examples 1 to 6 in which an odor was inhibited and a decrease in toughness was also minimized could be recycled, for example, by injecting them into a mold by an injection molding machine and molding resin parts for automobiles (for example, original parts), as shown in the lower part of FIG. 1.

Here, the present invention is not limited to the examples, and can be embodied by being appropriately changed without departing from the spirit and scope of the invention.

Figure 2:
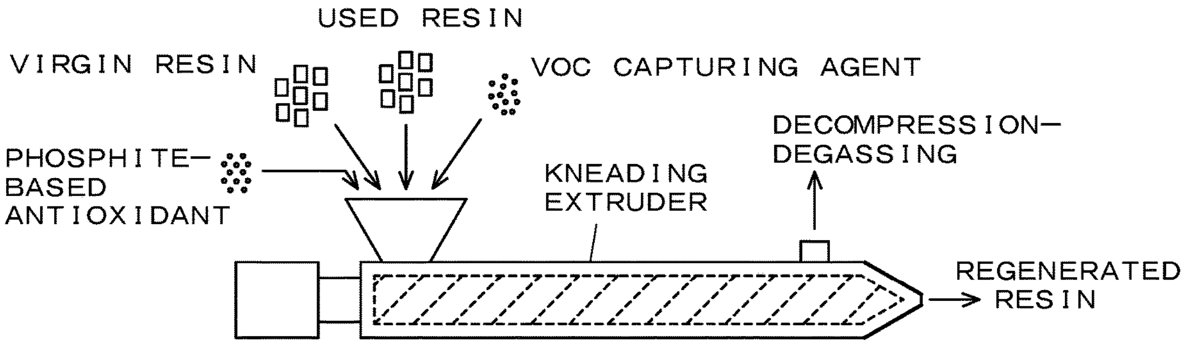
FIG. 2 is a diagram illustrating a method for regenerating a used resin of a modified example.

(1) As shown in FIG. 2, the present invention could be implemented by melt-kneading the used resin using only one kneading extruder, and at that time, blending in the virgin resin, adding the amine compound-based VOC capturing agent, and adding the phosphite-based antioxidant and the like, and performing decompression-degassing in a vacuum vent.

(2) The present invention could be implemented by adding other VOC capturing agents together with the amine compound-based VOC capturing agent to the used resin.

The invention claimed is:

1. A method for regenerating a used resin, comprising adding 0.03 wt % to 0.3 wt % of an amine compound-based volatile organic compound (VOC) capturing agent to the used resin, performing melt-mixing of the used resin using a kneading extruder and capturing at least formaldehyde and acetaldehyde among volatile organic compounds (VOCs) contained in the used resin by the amine compound-based VOC capturing agent, and vaporizing and removing volatile odor substances contained in the used resin containing the captured VOCs by performing decompression of the melt-mixed used resin in a vacuum vent of the kneading extruder.

2. The method for regenerating a used resin according to claim 1, wherein the used resin is derived from a scrapped automobile.

3. The method for regenerating a used resin according to claim 1, wherein a virgin resin is mixed into the used resin.

4. The method for regenerating a used resin according to claim 1, wherein a phosphite-based antioxidant is added to the used resin before the melt-mixing in the kneading extruder.

5. The method for regenerating a used resin according to claim 1, wherein the kneading extruder includes front and rear kneading extruders arranged in series.

6. The method for regenerating a used resin according to claim 1, wherein the amine compound-based VOC capturing agent includes at least one of aliphatic amines, diethylamine, hydroxylamine, hydrazine, hydrazide compounds, etheramine, amino acids, amino acid-modified silica gel, amine-supported aluminum hydroxide, aromatic amines, and heterocyclic amines.

7. A method for regenerating a used resin using a kneading extruder having a vacuum vent, the method comprising:

adding 0.03 wt % to 0.3 wt % of an amine compound-based volatile organic compound (VOC) capturing agent to the used resin within the kneading extruder, the 0.03 wt % to 0.3 wt % of an amine compound-based VOC capturing agent being based on a total of 100 parts by mass of resins contained in the kneading extruder, melt-mixing the used resin and the amine compound-based VOC capturing agent within the kneading extruder and capturing at least formaldehyde and acetaldehyde among volatile organic compounds (VOCs) contained in the used resin by the amine compound-based VOC capturing agent, and vaporizing and removing volatile odor substances contained in the used resin containing the captured VOCs by performing decompression of the melt-mixed used resin in the vacuum vent of the kneading extruder, wherein the amine compound-based VOC capturing agent includes at least one of aliphatic amines, diethylamine, hydroxylamine, hydrazine, hydrazide compounds, etheramine, amino acids, amino acid-modified silica gel, amine-supported aluminum hydroxide, aromatic amines, and heterocyclic amines.

8. The method for regenerating a used resin using a kneading extruder having a vacuum vent according to claim 7, wherein the used resin is derived from a scrapped automobile.

9. The method for regenerating a used resin using a kneading extruder having a vacuum vent according to claim 7, wherein a virgin resin is mixed into the used resin.

10. The method for regenerating a used resin using a kneading extruder having a vacuum vent according to claim 7, wherein a phosphite-based antioxidant is added to the used resin before the melt-mixing in the kneading extruder.

11. The method for regenerating a used resin using a kneading extruder having vacuum vent according to claim 7, wherein the kneading extruder includes front and rear kneading extruders arranged in series, and the vent is arranged in the rear kneading extruder.

* * * * *